United States Patent
Carney et al.

(10) Patent No.: US 7,480,886 B2
(45) Date of Patent: Jan. 20, 2009

(54) VLSI TIMING OPTIMIZATION WITH INTERLEAVED BUFFER INSERTION AND WIRE SIZING STAGES

(75) Inventors: Christopher M. Carney, Red Hook, NY (US); Vern A. Victoria, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 243 days.

(21) Appl. No.: 11/334,256

(22) Filed: Jan. 18, 2006

(65) Prior Publication Data
US 2007/0168900 A1      Jul. 19, 2007

(51) Int. Cl.
*G06F 17/50*      (2006.01)
(52) U.S. Cl. .................................. 716/13; 716/5; 716/6
(58) Field of Classification Search .................. 716/5–6, 716/8, 12–14
See application file for complete search history.

(56) References Cited

U.S. PATENT DOCUMENTS 7,010,767 B2 *   3/2006   Elassaad et al. ................. 716/6
7,013,438 B1 *   3/2006   Saldanha et al. ............... 716/2

OTHER PUBLICATIONS

P. Bai, et al., "A 65nm Logic Technology Featuring 35nm Gate Lengths, Enhanced Channel Strain, 8 Cu Interconnect Layers, Low-k ILD and 0.57 um2 SRAN Cell" pp. 1-4.

* cited by examiner

*Primary Examiner*—Vuthe Siek
(74) *Attorney, Agent, or Firm*—Lynn L. Augspurger; Cantor Colburn LLP

(57) ABSTRACT

The invention relates to layout of circuit components, including determining the interconnections, buffers, or path nets between circuit blocks or circuit components and input/output bonding pads. This is accomplished by a method and program product that optimizes timing comprising. Wiring layout and buffer insertion is accomplished by setting all wires in the design to an initial best possible value, inserting buffers in longest nets of wires of the design, and degrading the resulting nets. This is accomplished by a wire sizing routine which takes the nets and degrades them accordingly. This degrading is done through a combination of one or more of knocking the wires down to lower levels and reducing their thickness. The amount of degradation is dependent on the final slack.

8 Claims, 2 Drawing Sheets

VLSI TIMING OPTIMIZATION WITH INTERLEAVED BUFFER INSERTION AND WIRE SIZING STAGES

BACKGROUND

1. Field of the Invention

The invention relates to layout of circuit components, including determining the interconnections, buffers, or path nets between circuit blocks or circuit components and input/output bonding pads.

2. Background Art

Electronic design automation (EDA) tools, also known as computer aided design (CAD) tools, are used by designers of electronic circuits to create representations of circuit configurations, including representations of electronic cells (e.g., transistors), and interconnects between them. Commercially available electronic design automation (EDA) tools allow designers to create circuit layouts and to simulate the performance of the resulting digital circuit. Some EDA tools allow simulation of both digital and analog (timing, noise, crosstalk, attenuation) simulation without requiring the costly and lengthy process of fabrication and design.

One aspect of the "analog design" of digital circuits is the ability to design for and to compensate for timing delays and transmission line effects, including the ability to quickly see and fix problematic timing paths. In this way, electronic design automation tools allow designers to design digital circuits and substantially simultaneously compensate for timing delays and transmission line effects. Designing for analog effects, including transmission line effects, is part of the process of developing and implementing buffering and wiring solutions.

Modern electronic circuits operate at very high clock speeds. This means that these digital circuits must be designed so that signals traveling within the circuits are timed properly to successfully perform their tasks. A problem faced by designers is signal transmission delay throughout the electronic circuit. These delays and associated signal degradation are caused by the electronic cells and the interconnects between them. These delays and degradations are modeled as reactances (inductances and capacitances) and transmission line effects.

Recent and continuing technical advances in the art of circuit fabrication, allowing the construction of sub-micron electronic cells, has materially exacerbated these effects, decreasing the delay introduced by the electronic cells (cell delays) and thus has increased the apparent delay in signal transmission introduced by the interconnects (interconnect delays). Interconnect delay is due primarily to resistance and capacitance, relative to the cell delays. interconnect delays often exceed the cell delays.

To reduce ramp delays caused by the resistance and capacitance of the interconnect (a form of interconnect delay), buffer cells are inserted into the interconnect. The buffer cells themselves, however, introduce gate delays into the interconnect. This results in a tradeoff between reducing ramp delays and minimizing gate delays. For any given application, there is a number of buffer cells (in part dependent on the type of buffer cell) that represents a balance between the ramp delay and the gate delays in an interconnect structure, and this number of buffer cells meets both signal propagation and timing constraints.

One method of establishing the number of buffer cells, when there is only one receiving cell, involves inserting buffer cells based solely upon the length of the interconnect. This method however, only roughly approximates the number of buffer cells. This is because parameters of the driving electronic cell are not utilized in connection with the "analog" or "transmission line" parameters of the interconnect, such as capacitance, resistance, and inductance.

A typical electronic design method includes laying out the interconnects between electronic cells and then inserting buffer cells based upon the designer's best estimates. The method then involves performing a computer implemented analysis, such as using a SPICE analysis, that calculates the signal propagation delay and/or attenuation for that design based upon the actual parameters of the driving cell, buffer cells and interconnects. The circuit designer then adjusts the number, location, and/or type of the buffer cells to improve the "transmission line" parameters, such as the signal propagation delay and or attenuation, and performs a computer implemented analysis to determine if an improved or optimal number, placement and/or type of buffer cell can be found. This approach may require many iterations before an optimal number, placement and type of buffer cells is determined. Further, each iteration is often time consuming because the calculations are done real time, using an analog circuit simulation tool such as SPICE. Therefore, this iterative or "trial and error" approach, while more accurate than the "pure length" approach, is too time consuming for practical use if a desired number, placement and type of buffer cells is to be determined.

A need exists to optimize buffering and wiring solutions, including automatic wiring and buffer insertion, for VLSI design, and to allow timers and integrators to find complete buffer and wiring solutions, while maintaining a high quality solution. This is especially critical in seeking to strike a balance between late model timing results while attempting to achieve a realizable physical design. The problem is that traditional, prior art, single pass buffering and wiring stages become inadequate for designs characterized by a large fraction of nets that have very have very high fanouts. This is because all of these high fanout nets tend to be or are timing critical, so that a more aggressive solution is required. Moreover, the more control oriented and less data centric that a design is, the more critical timing and delays are.

There exists, therefore, a need for a system and method that are able to quickly and accurately determine, for a particular interconnect, the types and number of buffers to maintain signal speed within tolerance, and reduce uncertainly in signal propagation to ensure signal timing constraints are met.

SUMMARY OF THE INVENTION

The method and system described herein provides for the optimization of buffering and wiring solutions, including automatic wiring and buffer insertion, for VLSI design, and to allow timers and integrators to find complete buffer and wiring solutions, while maintaining a high quality solution, including compensating for timing delays and transmission line effects.

As described herein VLSI timing is optimized by preferring wires over buffers whenever possible. As long as there are enough resources for good wires available, this has the advantage of providing an excellent timing solution without requiring a physical track for the placement of a buffer.

Traditional buffering/wiring optimization routines perform buffer insertion first and then adjust the wire parameters later. This is inadequate for very complex VLSI designs because wire sizings do not end up optimized for the length (i.e., load) on which they can drive a signal. The invention described herein addresses this shortcoming by first assuming the best case wires are available initially, and then downsizing or degrading them where appropriate and rebuffering if required.

The method described herein assumes a best case wiring solution initially, and then interleaves buffer insertion and wire sizings to fix slack related problems. The wire sizing passes only make wires worse, not better, whenever possible. This is to ensure that there are enough tracks for all desired wires by completion of the run.

In a further embodiment of our invention, a known VLSI buffering tool (such as EDA's "ChipBench" suite) is segmented into multiple parallel routines. Each parallel routine represents a separate process on a computer system, and performs buffer insertion on a subset of the top level nets in a circuit design. The key to this exemplification is that each subset of nets is mutually exclusive. This insures that no net ends up with multiple solutions which will confuse the recombinatorial code in a subsequent step.

After the parallel buffering routines have been completed (and the results saved, e.g., in a VIM format), the recombinatorial code is run. The recombinatorial code scans all of the output code (e.g., the VIM files) from all of the parallel runs, and combines them into integrated VIM. The result is then submitted for a timing run.

Overall runtime improvement is based on the number of parallel routines established. For example, a design split to run buffer insertion in ten parallel routines would take approximately one tenth the normal amount of processing time.

FIGURES

DETAILED DESCRIPTION

Figure 1:
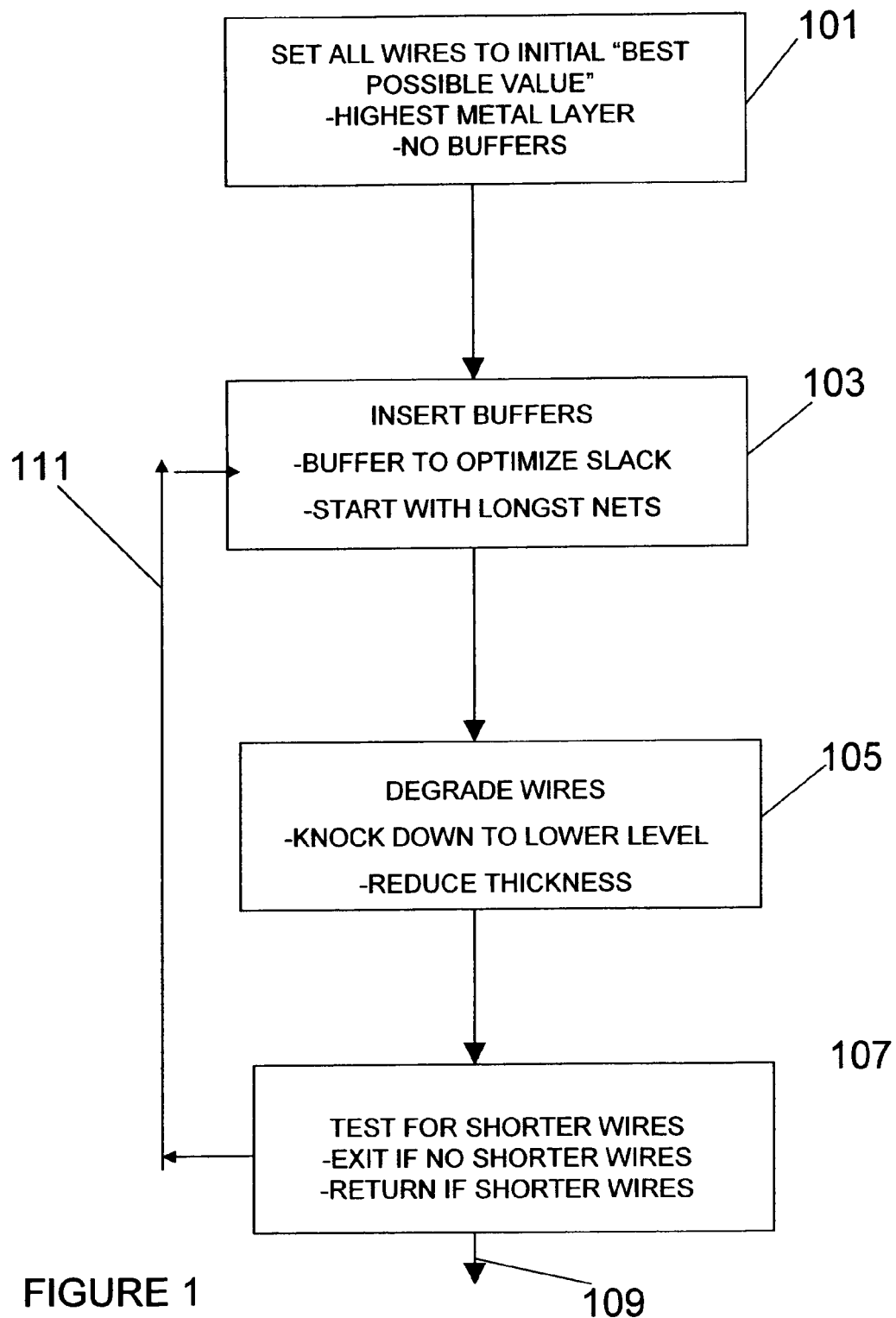
FIG. 1 is a flow chart for a method for wiring optimization by sequential wiring degradation and buffer insertion.
Figure 2:
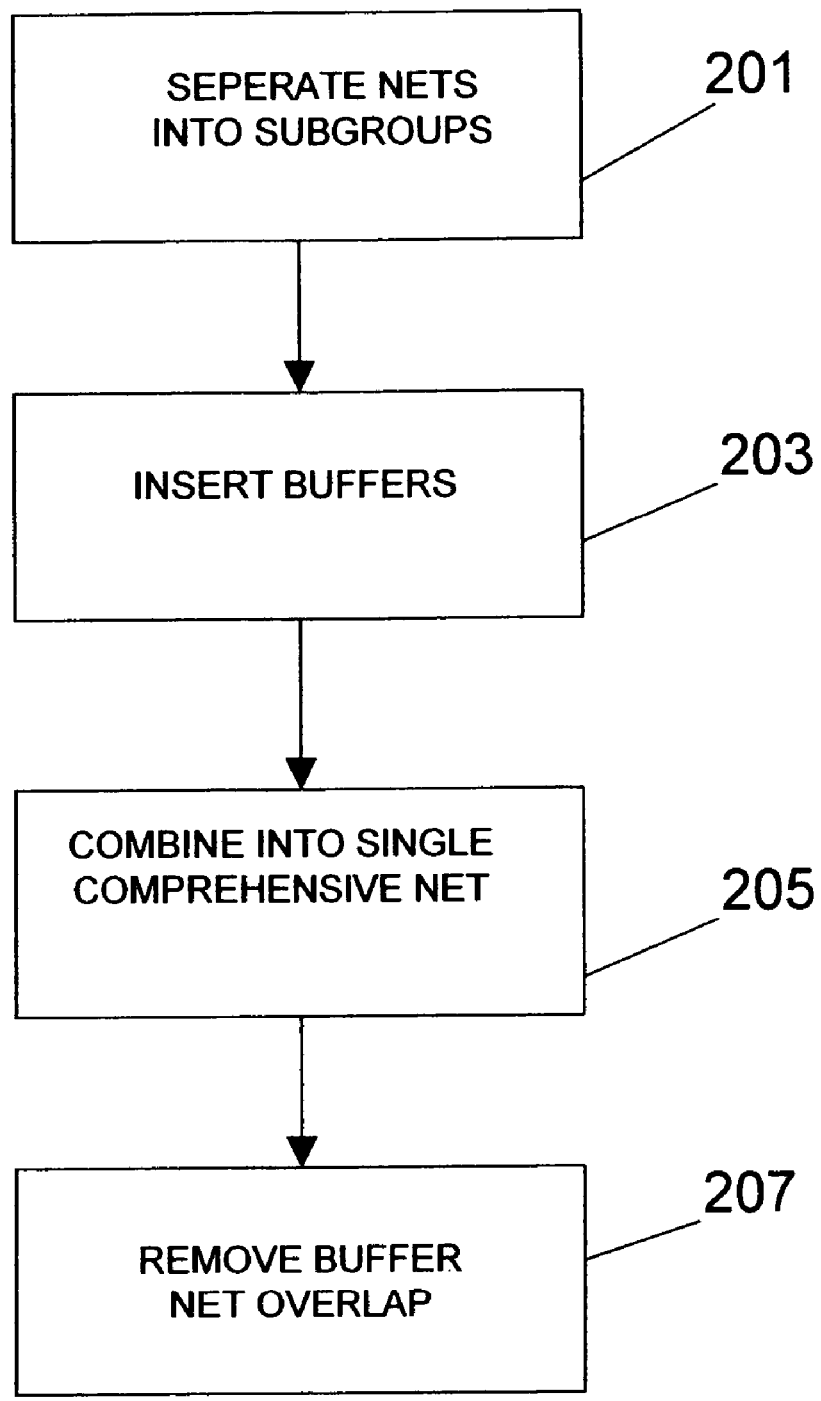
FIG. 2 is a flow chart for a method of parallel buffer insertion.

VLSI Timing Optimization. The VLSI timing optimization algorithm begins by first setting all wires in a design to the best possible value 101. This is usually the highest metal layer and widest wire. In the general case no buffers exist in the design, but this general case does not preclude situations where there are pre-existing buffers already present. These pre-existing buffers could, for example, be placed for architected buses or for very high fanout trees that traditionally take a long time to buffer. It I to be noted that the algorithms described herein will work for these cases as well.

In a next step, automatic buffer insertion 103 is run on the longest nets of wires in the design, for example using a tool like EDA's "ChipBench" suite. This is done to reduce slack. The longest nets are typically those that have overall lengths (summing up all segments for multi-fanout nets) at least twice as long as the best possible wire that can drive a normal load under nominal conditions. For instance, just by way of example, if the best possible wire can drive a typical load up to 45 mm on silicon, then the longest nets would consist of a group of nets whose overall length is at least 90 mm. This list of nets is passed to the buffering tool, which buffers the wires for slack optimization only.

Once the longest wires are buffered, a wire sizing routine is performed which takes these same nets and degrades them accordingly 105. This degrading is done through a combination of one or more of knocking the wires down to lower levels and reducing their thickness. The amount of degradation is dependent on the final slack. Then a test is carried out for shorter wires 107, and if shorter wires are found the process is repeated 111, otherwise the process is terminated 109.

The reason that the wires are degraded at all is because, frequently, after automatic buffer insertion completes, some of the nets are optimized too far. It then becomes a waste of resources with too many nets on the better layers that do not necessarily need to even be there. Degrading the wires is essential to insuring that the design can be fabricated, especially for designs that have hundreds of thousands of nets or more. Once the slack goal is achieved for a particular wire, the degradation step ends.

The wire degrading routine uses the relative physical characteristics of wires on different level and thickness. Each allowed level and thickness is called a wire type. The resistance and capacitance per distance of each wire type is used to calculate a delay per distance squared. This RC delay is then used to calculate the ratio of RC delays between different wire types. When degrading a wire the current delay of the wire is compared to how much slack is on that wire for timing. The ratio between the current wire delay and slacked is compared to delay per distance squared ratios of the current wire type versus other wire types. The wire is then degraded to the wire type whose delay per distance squared ratio best matches the wire delay to slack ratio. So in one calculation and table look-up we are able to find which wire thickness and level to degrade the wire to. This same process can be used to improve wires instead of degrade them.

The buffer insertions and wire sizing stages are interleaved with each other in the above manner more than once to yield the best possible results. This means that after the initial wire degradation stage, automatic buffer insertion is again performed. This time it is run on the next longest group of nets, since the longest group was previously buffered.

A good cutoff length to use for this stage is about one half the length used in the first or previous stage. Thus, if a 90 mm was used initially then all nets at least 45 mm in length would be buffered. This would include all original nets over 45 mm long plus any new nets that were formed when the original set of 90 mm and above were buffered and broken up into smaller pieces. After the automatic buffer insertion is complete for this set of nets, the same set is again degraded to lower wire layers and/or thicknesses.

The interleave process is repeated as many times as necessary 107, though usually four or five times is enough to produce good results. The following sequence summarizes the steps in the entire process and represents a real world solution used in a 64 way-L2 cache design:

1. Set all wires to the best possible layer and size
2. Run buffer insertion on all nets over 90 mm.
3. Degrade wires over 90 mm.
4. Run buffer insertion on all nets over 45 mm.
5. Degrade wires over 45 mm.
6. Run buffer insertion on all nets over 25 mm.
7. Degrade wires over 25 mm.
8. Run buffer insertion on all nets over 12 mm.
9. Degrade wires over 12 mm.
10. Run buffer insertion on all nets over 6 mm.
11. Degrade wires over 6 mm.

The above algorithm optimizes for slack. To optimize for slew additional buffering would be necessary, and typically post interleave. The above algorithm works better then traditional single-pass buffer/wire size strategies because it allows the wire technology to realize its full potential in driving loads, while at the same time minimizing the number of buffers by preferring a "wires" over a "buffers" solution.

Parallel Processing of Automatic Buffer Insertion. Buffer insertion may be effected in a parallel processing process. The parallel processing buffer insertion can utilize any established buffering routine to optimize slack based timing, so long as the partial solution (from each parallel run) can be saved to storage in a compatible format, for example, a VIM format. Buffering can run in large networked environments consisting of multi-processor machines with large amounts of memory.

A requirement is that each machine has at least enough main memory as is required to run the entire design through a predetermined buffering process. Another desirable attribute for the machines, individually, is that they all have similar processor clock speeds. This is because having one machine significantly slower then the others will hold up the final design recombination process. The entire process can be split into three phases with an initial phase that need be set up only once for unlimited runs.

Initial Phase (to be performed only once) The nets in the design are separated into their respective sub-groups 201. This can be by any method desired so long as each net is represented only once throughout all of the groups. The preferred way to create the groupings is by geographical region on the physical design of the chip. This minimizes potential buffer overlapping later on.

Phase 1—Parallel Process Launch The automatic buffering tool is invoked on each group of nets, one machine per group. In an AIX, UNIX, or Linux environment, a set of control scripts can be used to send each group of nets, or job, to a list of machines over a network, such as a batch pool. Each machine will then have the buffer code runs against its own group of nets 203. Once all jobs have finished, the buffered solution for each group of nets is written to memory, for example in VIM format.

Phase 2—Design Recombination In order to make use of all the separate buffer solutions (VIMs), they must be combines into single comprehensive VIM file. A perl script is run in this phase which parses through each VIM from each of the parallel runs, and then recombines them into one VIM 205. Depending on the complexity of the design this phase can take from seconds to minutes.

Phase 3—Legalization After the final VIM is created, it is loaded by the same buffering tool as above, and legalization is then performed. In this step, buffer overlaps are removed by sliding and/or spiraling buffers away from each other in two dimensional space 207. Since each parallel routine has no way to know where the other routines are placing buffers, this step is crucial to validate the final integrity of the physical design. Once all legalization is complete, the legalized VIM is written back out to memory. It is this legalized VIM which now serves as a basis for all subsequent timing report generation and comparisons.

A further aspect of the invention is a program product to optimize timing in a VLSI. The program product comprises a substrate having computer readable code thereon. The code configures and directs a computer to perform a process for wire layout in an electronic circuit design to optimize timing comprising. The process sets all wires in the design to an initial best possible value. This is followed by inserting buffers in longest nets of wires of the design; and degrading the resulting nets.

The computer code for setting all wires in the design to an initial best possible value is such that the initial best possible value comprises a highest metal layer with widest wire, and the computer code for inserting buffers works on the longest nets of wires having overall lengths, as a sum of all segments for multi-fanout nets, at least twice as long as the best possible wire, and the best possible wire is a wire that can drive a normal load under nominal conditions.

Degrading the wires utilizes a wire sizing routine that comprises one or more of knocking the wires down to lower levels and reducing their thickness. The last part of the computer code is computer code for separating nets into subgroups, inserting buffers, combing the nets with buffers inserted into a single comprehensive net, and removing buffer net overlap.

While the invention has been described with respect to certain preferred embodiments and exemplifications, it is not intended to limit the scope of the invention thereby, but solely by the claims appended hereto.

We claim:

1. A method of wire layout in an electronic circuit design to optimize timing comprising:
   a) setting all wires in the design to a highest metal layer and widest wire;
   b) inserting buffers in longest nets of wires in the design, wherein said longest nets of wires have overall lengths, as a sum of all segments for multi-fanout nets, at least twice as long as a best wire that can drive a normal load under nominal conditions; and
   c) degrading nets based on a wire delay to slack ratio, and
   d) repeating steps b) and c) for optimizing slack.

2. The method of claim 1, wherein a delay on a wire depends on a width and layer of the wire.

3. The method of claim 1 comprising degrading the wires by a wire sizing routine comprising one or more of knocking the wires down to lower levels and reducing their thickness.

4. The method of claim 1 comprising separating nets into subgroups, inserting buffers, combing the nets with buffers inserted into a single comprehensive net, and removing buffer net overlap.

5. A program product comprising a substrate having computer readable code thereon, said code configuring and directing a computer to perform a process for wire layout in an electronic circuit design to optimize timing comprising, said process:
   a) setting all wires in the design to a highest metal layer and widest wire;
   b) inserting buffers in longest nets of wires in the design, wherein said longest nets of wires have overall lengths, as a sum of all segments for multi-fanout nets, at least twice as long as a best wire that can drive a normal load under nominal conditions;
   c) degrading nets based on a wire delay to slack ratio; and
   d) repeating steps b) and c) for optimizing slack.

6. The program product of claim 5, wherein a delay on a wire depends on a width and layer of the wire.

7. The program product of claim 5 comprising computer code for degrading the wires by a wire sizing routine comprising one or more of knocking the wires down to lower levels and reducing their thickness.

8. The program product of claim 5 comprising computer code for separating nets into subgroups, inserting buffers, combing the nets with buffers inserted into a single comprehensive net, and removing buffer net overlap.

* * * * *